Patented Apr. 6, 1954

2,674,592

UNITED STATES PATENT OFFICE 2,674,592

FIBER-FORMING COPOLYMERS OF ACRYLONITRILE AND ISOPROPENYLPYRIDINES

Earl W. Gluesenkamp, Centerville, and George E. Ham, Dayton, Ohio, assignors, by mesne assignments, to The Chemstrand Corporation, a corporation of Delaware No Drawing. Application September 15, 1950, Serial No. 185,159

15 Claims. (Cl. 260—85.5)

This invention relates to new copolymeric compositions having unusual value in the formation of synthetic fibers. More specifically the invention relates to copolymers of acrylonitrile and isopropenylpyridine and to a useful method for preparing them.

Polyacrylonitrile and copolymers of acrylonitrile and other polymerizable olefinic monomers are well-known to the art. In general such compositions are valuable materials for the fabrication of synthetic fibers, but many are not universally useful because of the lack of sufficient dye affinity. Copolymers of 90 to 98 per cent acrylonitrile and from 2 to 10 per cent of a vinylpyridine are known to the art to be useful, dyeable compositions, but they possess certain inherent disadvantages which otherwise restrict their usage. One of these disadvantages is the slight yellow or amber discoloration which is developed during the polymerization of the vinylpyridine and the acrylonitrile. A further disadvantage of the copolymers of acrylonitrile and vinylpyridine lies in the active nature of the vinylpyridine which may polymerize spontaneously during its preparation, storage or use. To avoid the spontaneous polymerization it has been necessary to introduce polymerization inhibitors, the removal of which introduces extra operations in the preparation of the synthetic fibers.

The purpose of the present invention is to provide a substitute for acrylonitrile-vinylpyridine copolymers, which substitute does not discolor, or otherwise interfere with the development of reproducible light shades of color. A further purpose of the present invention is to provide a comonomer for acrylonitrile which is stable to polymerization and which may be stored without the use of polymerization inhibitors. A still further purpose of the present invention is to provide a new copolymeric solution as a use for an all-purpose fiber-forming composition.

It has been found that the prior art copolymers of acrylonitrile and vinylpyridine may be modified by the substitution of all or part of the vinylpyridine with an isopropenylpyridine. Copolymers so prepared will have the inherent yellow or amber discoloration minimized or entirely eliminated. Useful copolymers of this type may be comprised from 85 to 98 per cent acrylonitrile, from 2 to 15 per cent of isopropenylpyridine and may additionally contain small amounts of vinylpyridine, for example up to 10 per cent. Suitable isopropenylpyridines and alkyl substituted isopropenylpyridines are alpha-isopropenylpyridine, beta-isopropenylpyridine, gamma-isopropenylpyridine, 2-isopropenyl-6-methylpyridine, and 2-isopropenyl-4-methylpyridine.

The new copolymers may be prepared by a wide variety of conventional methods, but the aqueous emulsion or aqueous dispersion polymerizations are to be preferred. The method generally involves the mixing of the monomers and contacting them either batchwise or continuously in the presence of free radical producing catalysts and agents to prevent agglomeration of the polymer and to promote the dispersion in the reaction medium.

The preferred polymerization method requires as a dispersing agent a water-soluble salt of an aldehyde condensed aromatic sulfonic acid. Suitable dispersing agents are the sodium salt of a formaldehyde condensed mononaphthalene sulfonic acid, the sodium salt of a formaldehyde condensed hexadecylbenzene sulfonic acid and other alkali metal salts of aldehyde condensed alkylaryl or aryl sulfonic acid. Although any water-soluble salt of this type is useful as a dispersing agent, sodium salts are preferred. The dispersing agent may be used in proportions from 0.05 to 0.50 per cent based on the weight of the monomer to be charged, and the optimum concentration is between 0.08 and 0.15 weight per cent. The stabilizer may be charged to the polymerization reactor at the beginning of the reaction or it may be added continuously or periodically throughout the course of the reaction in order to achieve the desired concentration in the reaction mass.

The new reaction is catalyzed by means of an alkali metal persulfate, preferably potassium persulfate, which is used to the extent of 0.5 to 2 per cent by weight of the monomer to be polymerized. The optimum catalyst concentration is from 0.8 to 1.5 per cent, when the conditions of reaction are such as to utilize the catalyst efficiently. The reaction may be conducted by adding the catalyst to the aqueous medium prior to the introduction of monomer, but preferred operation utilizes a continuous or periodic addition of the catalyst so as to maintain approximately a uniform concentration in the reaction mass throughout the course of the reaction.

The new method, if desired, may utilize a conventional molecular weight regulator, for example, t-dodecyl mercaptan, which may be added at the beginning of the reaction or during the reaction. Preferred operation utilizes a small concentration of catalyst, dispersing agent, and if desired, the regulator in the aqueous medium at the beginning of the reaction. The additional catalyst, dispersing agent and regulator are added continuously throughout the reaction by means of a suitable metering device for adding the agents at a uniform pre-determined rate.

The reaction is conducted at a temperature between 65° C. and 90° C. and is coordinated so that the reaction will be substantially completed when all of the desired lot of monomers have been added to the reaction mass. The rate of addition is fixed so that it will be completed within a desirable, short reaction period, for example, one to four hours. The reaction is controlled by the rate of addition of the monomer and the temperature is preferably the reflux temperature for the reaction mass. Under such conditions slight fluctuations of the temperature of reflux may occur as the reaction proceeds.

The new method may also be operated by maintaining constant reflux temperature and adding the monomers at a variable rate as is required to maintain the reflux temperature constant at all times. In this manner a convenient means of adding the monomers at the rate of utilization is provided, whereby the quantity and proportion of unreacted monomers in the reaction mass remain substantially constant.

In the practice of this invention, prior to the introduction of the acrylonitrile or mixture of acrylonitrile and other monomers, the water charged to the reactor is heated to approximately the temperature at which the polymerization is expected to proceed. The monomer stream then is introduced and the agitation begun. Almost immediately the reaction mass begins to boil, the evolved vapors being condensed and returned to the reactor. The reflux temperature may then be maintained by regulation of the monomer addition, or the reflux temperature may be permitted to seek its own level by continuing the monomer addition at a constant rate. In either case, desirable fiber-forming copolymers are obtained, but one or the other of these methods may be preferred under varying conditions of operation.

In the preparation of acrylonitrile copolymers the rate of polymerization of the acrylonitrile and other monomers will not be identical, and therefore one or the other may copolymerize more rapidly. The monomers will, however, combine in a fixed proportion which bears a definite relationship to the proportions of monomer in the reaction mixture. Thus, if a polymer of a uniform fixed monomer ratio is desired it will be necessary to maintain the proportion of monomers in the reaction mass substantially uniform throughout the reaction period. This condition is not always easily attained, since it requires the pre-determination of the relationship between proportions of monomers in the reaction mass and the proportion of monomer polymerizing. An approximation of the ideal conditions may be obtained by charging the monomers in the ratios desired in the ultimate polymer at a rate only slightly in excess of the rate of consumption of monomers in the polymerization reaction. Under such conditions the first increment of polymer will be slightly different from that desired, but each successive increment will approach the desired proportions as the monomer proportions in the reaction mixture adjust themselves to that ratio which will produce the desired ultimate polymeric composition.

If desired, the ideal conditions of operation may be attained by initially charging to the reactor monomers in the proportion which will produce the desired ultimate copolymer, and thereafter charging the monomers in the proportions desired in the ultimate copolymer. Such operations will insure copolymers of the desired proportions throughout the entire reaction.

After all of the monomer charge has been added to the reactor it will be apparent that some unreacted monomers will still be present. Obviously if the polymerization continues, polymers of the desired composition cannot be formed, since the reaction mixture will become depleted with respect to the more reactive monomer. Thereafter the polymer composition will change in accordance with the changes in the proportion of the unpolymerized monomers. In order to avoid this changing proportion of monomer in the reaction mixture it is often desirable to interrupt the polymerization as soon as the last increment of monomer has been added. This interruption may be achieved by destroying one or more of the essential conditions of polymerization, for example, by reducing the temperature, by adding a polymerization inhibitor or by rapid steam distillation of the mass to remove unreacted monomers. The interruption of the reaction as soon as the monomers are all added to the reactor will insure optimum polymer properties, although the practice does lower the yield.

These polymerizations are preferably conducted in glass or glass-lined steel vessels, which are provided with efficient means for agitation. Generally, rotary stirring devices are more desirable, but other means for insuring intimate contact of reagents may be employed successfully, for example, by rocking or tumbling the reactor. The polymerization equipment generally used is conventional in the art and may be varied to suit the type of reaction contemplated. Generally semi-continuous operation is preferred, that is, where a fixed lot of monomer is polymerized by continuous addition to the reactor and the entire charge removed when the reaction is completed. Fully continuous operation, wherein a portion of the polymer is periodically or continuously removed, may also be utilized. It is, however, essential in the practice of this invention that the proportions of dispersing agent, catalyst, water and monomer be maintained.

Further details of the practice of this invention are set forth with respect to the following specific examples:

*Example 1*

A glass-lined reaction vessel provided with a rotary stirrer, a temperature measuring device and a reflux condenser was charged with 400 parts by weight of distilled water, 184 parts of acrylonitrile, 16 parts of 2-isopropenylpyridine, 2 parts of potassium persulfate and 0.2 part of the sodium salt of a formaldehyde condensed naphthalene sulfonic acid. Reaction was allowed to occur at room temperature for 24 hours and the resulting polymer slurry was steam distilled to remove unreacted monomers. A substantial yield of a copolymer was obtained by filtration.

The copolymer was dissolved in N,N-dimethylacetamide to form an 18 per cent solids solution. This solution was then extruded through a spinneret having ten apertures each 0.005 inch in diameter through a mixture of 60 per cent N,N-dimethylacetamide and 40 per cent water. The fiber so produced was washed thoroughly with water, stretched 468 per cent in a steam tube and the fiber so obtained was pure white in color, free splitting, had a tenacity of 3.9 g./d., an elongation of 7 per cent, and a boil shrinkage of 8.7 per cent.

A one gram skein of fiber completely exhausted in 60 minutes at 90° C. a dye bath containing one ml. of 2 per cent Wool Fast Scarlet Dye, 5 ml. of 3 per cent sulfuric acid and 40 ml. of water. In another dyeing experiment an entire bath containing five times the concentration of Wool Fast Scarlet Dye was 50 per cent exhausted in one hour.

*Example 2*

A glass reaction vessel was charged with 340 grams of water and 0.2 gram of the sodium salt of a formaldehyde condensed naphthalene sulfonic acid. The vessel was provided with a stirring mechanism, a dropping funnel and a reflux condenser. Over a period of one and one-half hours at 80° C. a previously prepared mixture of 184 grams of acrylonitrile, 12 grams of α-vinylpyridine and 4 grams of α-isopropenylpyridine were added dropwise. During the reaction six 20-ml. proportions of a 3.3 per cent potassium persulfate solution were added at equal intervals. A yield of approximately 95 per cent of copolymer was recovered which was capable of being fabricated into good, dyeable, synthetic fibers.

*Example 3*

A one-ounce glass bottle with a tightly fitted cover was charged with ten grams of α-isopropenylpyridine and 0.01 gram of benzoyl peroxide. The closed bottle was heated for fourteen days at 55° C. No polymerization took place. This demonstrates the unusual stability of the isopropenylpyridines, which is vividly contrasted with Examples 1 and 2, wherein good yields of copolymers were obtained by polymerization in the presence of acrylonitrile.

The invention is defined by the following claims.

What we claim is:

1. A copolymer comprising by weight from 85 to 99% acrylonitrile and from one to 15% of a compound selected from the group consisting of alpha-isopropenylpyridine, beta-isopropenylpyridine, gamma-isopropenylpyridine and isopropenylpyridines containing a single methyl group on the heterocyclic ring, in which copolymer the only non-heterocyclic monomer is acrylonitrile, the percentage of monomers in the copolymer totaling 100%.

2. A copolymer of 90 to 98% of acrylonitrile and from 2 to 10% of an isopropenylpyridine containing a single methyl group on the heterocyclic ring, said percentage of monomers in the copolymer totaling 100%.

3. A copolymer of 90 to 98% of acrylonitrile and from 2 to 10% of alpha-isopropenylpyridine, said percentage of monomers in the copolymer totaling 100%.

4. A copolymer of 90 to 98% of acrylonitrile and from 2 to 10% of beta-isopropenylpyridine, said percentage of monomers in the copolymer totaling 100%.

5. A copolymer of 90 to 98% of acrylonitrile and from 2 to 10% of gamma-isopropenylpyridine, said percentage of monomers in the copolymer totaling 100%.

6. A copolymer of 90 to 98% of acrylonitrile and from 2 to 10% of 2-isopropenyl-6-methylpyridine, said percentage of monomers in the copolymer totaling 100%.

7. A copolymer of 90 to 98% of acrylonitrile and from 2 to 10% of 2-isopropenyl-4-methylpyridine, said percentage of monomers in the copolymer totaling 100%.

8. A copolymer of 85 to 98% of acrylonitrile, up to 8% vinylpyridine, and from 2 to 10% of a compound of the group consisting of alpha-, beta-, and gamma-isopropenylpyridine, and isopropenylpyridines containing a single methyl group on the heterocyclic ring, said percentage of monomers in the copolymer totaling 100%.

9. The method of preparing dyeable copolymers which comprises heating from 85 to 99% of acrylonitrile and from one to 15% of a compound of the group consisting of alpha-, beta-, and gamma-isopropenylpyridine, and isopropenylpyridines containing a single methyl group on the heterocyclic ring, in the presence of an aqueous medium and from 0.005% to 0.5% of a water-soluble salt of an aldehyde condensed aromatic sulfonic acid and in the presence of 0.5 to 2% by weight of an alkali metal persulfate, said percentages being based on the total weight of the polymerizable monomers, and the monomers in the copolymer totaling 100%.

10. The method of preparing dyeable copolymers which comprises heating from 90 to 98% of acrylonitrile and from 2 to 10% of a compound of the group consisting of alpha-, beta-, and gamma-isopropenylpyridine, and isopropenylpyridines containing a single methyl group on the heterocyclic ring, in the presence of an aqueous medium and from 0.005% to 0.5% of a water-soluble salt of an aldehyde condensed aromatic sulfonic acid and in the presence of 0.5 to 2% by weight of an alkali metal persulfate, said percentages being based on the total weight of the polymerizable monomers, and said monomers totaling 100%.

11. The method as defined in claim 10 wherein the compound is alpha-isopropenylpyridine.

12. The method as defined in claim 10 wherein the compound is beta-isopropenylpyridine.

13. The method as defined in claim 10 wherein the compound is gamma-isopropenylpyridine.

14. The method as defined in claim 10 wherein the compound is 2-isopropenyl-6-methylpyridine.

15. The method as defined in claim 10 wherein the compound is 2-isopropenyl-4-methylpyridine.

References Cited in the file of this patent

UNITED STATES PATENTS

| Number | Name | Date |
|---|---|---|
| 2,467,430 | Izard | Apr. 19, 1949 |
| 2,491,471 | Arnold | Dec. 20, 1949 |

OTHER REFERENCES

Bachman et al., J. Am. Chem. Soc., 70, 2381–2384 (1948).